Jan. 13, 1959     C. E. BROOKE     2,868,145
DEVICE FOR CUTTING DOUGH
Filed Feb. 11, 1957

INVENTOR.
Chester E. Brooke
BY
Fulwider, Mattingly
and Huntley ATTORNEYS

United States Patent Office 2,868,145
Patented Jan. 13, 1959

2,868,145
DEVICE FOR CUTTING DOUGH
Chester E. Brooke, San Diego, Calif.
Application February 11, 1957, Serial No. 639,395
2 Claims. (Cl. 107—46)

The present invention relates to a device for cutting dough.

The present invention is a device which is used in combination with a rolling pin. The device includes a circularly shaped disc, the top side of which forms a dough board on which a glob of the dough, to be cut, is placed. This dough is then flattened on the board by a rolling pin. The circularly shaped board is supported on inwardly extending lugs of an annulus. The circular upper and inner edge of the annulus forms a cutting edge for severing the dough into a disc. The lugs are received by recesses in the bottom side of the dough board. These recesses complement the lugs in vertical cross-section.

The recesses are arranged in a plurality of sets, the recesses in each set being equal in number to the number of lugs, and each set differing in depth so that the distance between the top surface of the board and the upper circular cutting edge of the annulus can be selectively varied whereby the thickness of the dough can be selectively varied.

Further objects and advantages will be apparent from the following description, reference being had to the accompanying drawings wherein a preferred embodiment of the invention is illustrated.

Referring more particularly to the drawings, the dough-cutting device generally shown at 20 comprises an annulus 21 which may be formed of wood or plastic, and a closely interfitting disc 22 which too may be formed of wood or plastic.

Figure 1:
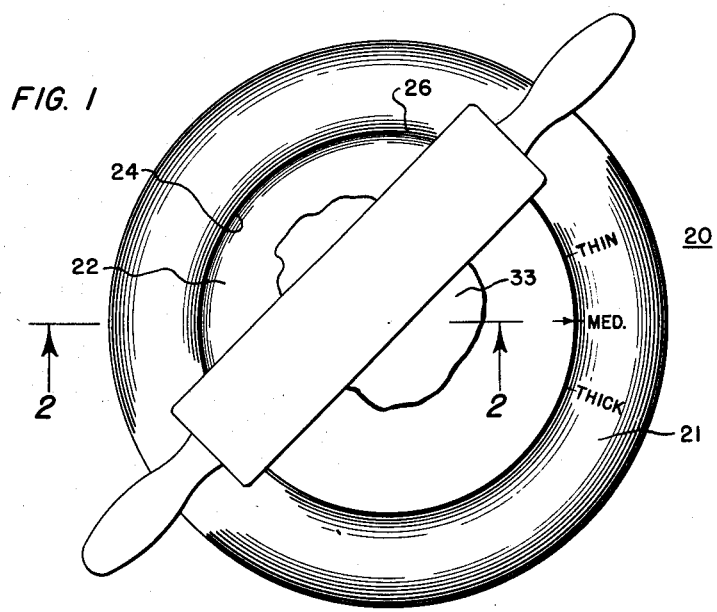
Fig. 1 is a top plan view of my improved device showing the same in combination with rolling pin.
Figure 2:
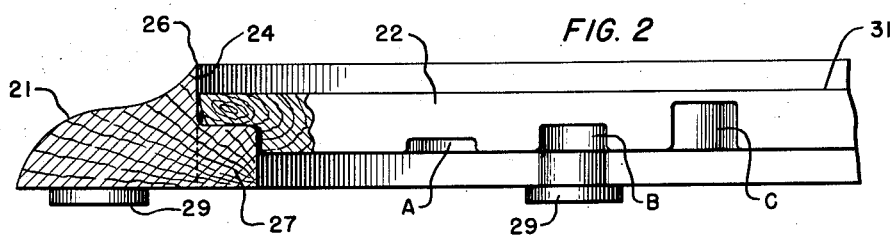
Fig. 2 is a fragmentary sectional view on a larger scale, the section being taken substantially along line 2—2 of Fig. 1.
Figure 3:
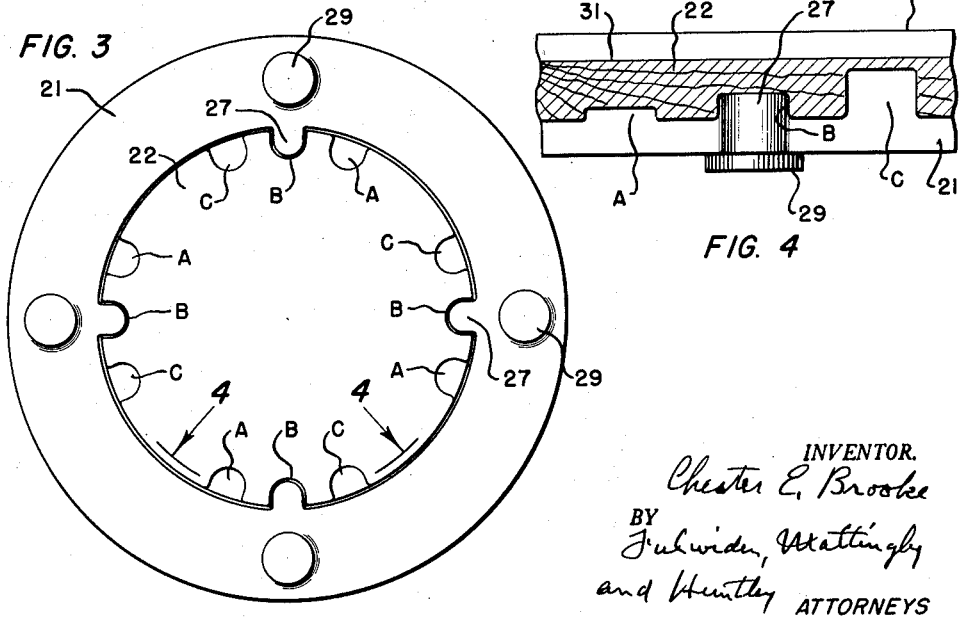
Fig. 3 is a bottom view of the device, the scale being in the same order as that of Fig. 1.
Figure 4:
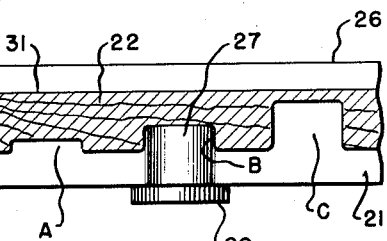
Fig. 4 is a fragmentary sectional view on a larger scale and taken substantially along line 4—4 of Fig. 3 but showing the lug on the annulus in elevation.

As is more clearly shown in Fig. 2 the annulus projects upwardly at the inner boundary line 24 thereof, to provide a circular apex or cutting edge 26. The annulus is provided with a plurality of inwardly extending lugs 27; preferably four of these lugs are provided, spaced an equal distance from one another, and preferably projected radially inwardly. The annulus is supported on buttons 29; these buttons may be formed of a resilient frictional material such as rubber to add stability, that is, to minimize sliding of the annulus on a smooth surface.

The vertical thickness of the disc 22 is less than the height of the annulus at the inner boundary 24 thereof. The upper surface 31 of the disc functions as a dough board. The under side of the disc 22 is provided with a plurality of sets or series of recesses, the recesses in each set being equally numbered to the number of the lugs. Preferably four lugs are provided and therefore each set includes four recesses. Each set differs in depth so that the distance between the top surface 31 of the board 22 and the upper circular cutting edge 26 of the annulus can be selectively varied, whereby the thickness of the dough can be selectively varied. More specifically, I preferably provide three sets of recesses, A, B and C. Preferably the most inwardly extending portions of the lugs 27 are curved and likewise the lugs are curved at the junction with the annulus so that these parts can be readily cleaned. The recesses A, B and C substantially complement the lugs in vertical cross-section.

In operation, the disc is moved so that the recesses of one set receive the lugs 27. If a thick piece of dough is desirable the disc or board 22 is moved so that its recesses C are received by the lugs 27; or, if a thin piece of dough, for example for pie crust, is desired, the board 22 is moved so that the recesses A thereof receive the lugs 27. The board 22 is shown wherein the lugs 27 are being received by the intermediate depth recesses B.

In operation, after the board 22 has been moved so as to provide the desired thickness of dough, a glob of dough 33 is placed on the board and then rolled to flatten the same, and then after desirable rolling, sufficient pressure is added to the roll, across the entire circular area of the cutting edge 26, to sever the dough and thereby provide a circular disc of dough.

Thus, it will be seen from the foregoing I have provided a simple device for forming, for example, pie crust. This device is relatively inexpensive. Also, no sharp corners are necessary and, therefore, both the annulus and the disc can be readily washed.

While the form of the embodiment herein shown and described constitutes a preferred form, it is to be understood that other forms may be adopted falling within the scope of the claims that follow. I have shown only four lugs 27 for the purpose of simplicity but I prefer to use a larger number such as eight. It will also be understood that while I have only shown three different depth recesses a larger number could be employed.

I claim:

1. A device for cutting dough comprising in combination, an annulus, the upper surface at the inner boundary line of said annulus projecting upwardly to provide a circular dough cutting edge; a plurality of inwardly extending lugs spaced equidistant of one another along the inner periphery of said annulus, said lugs terminating below said dough cutting edge; and a disc rotatably carried within the annulus, the periphery of the disc lying adjacent the inner boundary of the annulus; a plurality of sets of recesses in the underside of the disc and disposed to complement the lugs, each set having recesses equal in number to the number of lugs, and each set differing in depth.

2. A device as defined in claim 1, characterized in that the vertical width of the disc between the tops of the most shallow recesses is less than the vertical distance between the tops of the lugs and said circular cutting edge.

References Cited in the file of this patent
UNITED STATES PATENTS 2,355,307     Kors _____ Aug. 8, 1944
2,650,552     Wood _____ Sept. 1, 1953